US012572484B2

(12) United States Patent
McDaniel

(10) Patent No.: US 12,572,484 B2
(45) Date of Patent: Mar. 10, 2026

(54) HDMI DISPLAY CONTROL

(71) Applicant: Wayne McDaniel, Ft. Myers, FL (US)

(72) Inventor: Wayne McDaniel, Ft. Myers, FL (US)

( * ) Notice: Subject to any disclaimer, the term of this patent is extended or adjusted under 35 U.S.C. 154(b) by 34 days.

(21) Appl. No.: 18/451,169

(22) Filed: Aug. 17, 2023

(65) Prior Publication Data

US 2025/0061072 A1    Feb. 20, 2025

(51) Int. Cl.
*G06F 13/24* (2006.01)
*G06F 13/40* (2006.01)
*H04N 21/4363* (2011.01)

(52) U.S. Cl.
CPC .......... *G06F 13/24* (2013.01); *G06F 13/4081* (2013.01); *H04N 21/43635* (2013.01)

(58) Field of Classification Search
CPC ............. G06F 13/4022; G06F 13/4282; G06F 13/4027; G06F 13/24; G06F 13/4081; G06F 13/28; G06F 13/385; H04N 21/43635
See application file for complete search history.

(56) References Cited

U.S. PATENT DOCUMENTS

| | | | | |
|---|---|---|---|---|
| 2013/0086622 A1* | 4/2013 | Narushima | ...... | H04N 21/43635 |
| | | | | 725/138 |
| 2016/0140075 A1* | 5/2016 | Kashyap | ............. | G06F 13/4265 |
| | | | | 710/104 |
| 2017/0293584 A1* | 10/2017 | Satheesh | ............. | G06F 13/4022 |
| 2024/0071335 A1* | 2/2024 | Song | ..................... | H02J 3/0075 |

* cited by examiner

*Primary Examiner* — Ernest Unelus
(74) *Attorney, Agent, or Firm* — Distinct Patent Law; Justin P. Miller

(57) ABSTRACT

The HDMI display controller allows a user to electrically disconnect an HDMI display from a source while leaving the associated cables in place. Disconnection is accomplished by routing electrical signals present in the wiring of the HDMI cable through one or more controller chips or switches. The user operates an external switch or button that disconnects or breaks an electrical signal that is passing along one or more wires.

3 Claims, 9 Drawing Sheets

| Pin | Signal | Description |
|---|---|---|
| 1 | TMDS Data2+ | TMDS lanes |
| 2 | TMDS Data2 Shield | |
| 3 | TMDS Data2- | |
| 4 | TMDS Data1+ | |
| 5 | TMDS Data1 Shield | |
| 6 | TMDS Data1- | |
| 7 | TMDS Data0+ | |
| 8 | TMDS Data0 Shield | |
| 9 | TMDS Data0- | |
| 10 | TMDS Clock+ | |
| 11 | TMDS Clock Shield | |
| 12 | TMDS Clock- | |
| 13 | CEC | CEC control |
| 14 | Reserved/Utility/HEAC+ | HDMI 1.4+, optional, HDMI Ethernet Channel and Audio Return Channel may be N.C. on device |
| 15 | SCL | DDC clock |
| 16 | SDA | DDC data |
| 17 | DDC/HEC/CEC Ground | |
| 18 | +5 V Power | power EDID/DDC |
| 19 | Hot Plug Detect/HEC Data- | HDMI 1.4+, optional, HDMI Ethernet Channel and Audio Return Channel |

FIG. 4

HDMI DISPLAY CONTROL

FIELD

This invention relates to the field of HDMI cabling and more particularly to a device for activating and deactivating an external display connected via an HDMI cable.

BACKGROUND

HDMI (High-Definition Multimedia Interface) cables are commonly used to connect audio and video components in the home and office. This includes devices such as computer monitors, televisions, projectors, various external displays, streaming media players, and so forth.

An HDMI cable includes protocols that allow a source, such as a computer, to be notified when a display has been connected. Having a display automatically turn on, and potentially mirror the display of a user's computer, can create problems.

For example, when a laptop is used for presentation it may be helpful to disable the external display between presentations.

Or when the laptop is used to present discrete items, such as exhibits in a court case, disabling the external display while the user searches for the next exhibit results in a more organized presentation.

Currently, disabling the external display requires either disabling the display in a menu within the computer's operating system or physically unplugging the HDMI cable. Both methods are inefficient.

What is needed is a way for a user to disable an external HDMI display without physically unplugging the display from the source.

SUMMARY

The HDMI display controller allows a user to electrically disconnect an HDMI display from a source while leaving the associated cables in place.

Disconnection is accomplished by routing electrical signals present in the wiring of the HDMI cable through one or more controller chips, modules, or switches. The user operates an external switch or button that disconnects or breaks an electrical signal that is passing along one or more wires or signal paths.

In a first embodiment of the invention, the switch disconnects all wires, simulating the HDMI cable being fully unplugged.

In a second embodiment of the invention, the switch disconnects only one wire. For example, the HPD, or hot plug detect. Disconnecting this wire simulates removal of the plug.

In the third embodiment of the invention, alternative collections of wires/signal lines are disconnected by the switch. For example, the data carried along the wires one through twelve, corresponding with pins one through twelve, which carry video and audio data. In this embodiment, when the switch is actuated, the source would still believe the display to be connected, but the display would not receive video information and therefore would have no data to display.

Restated, an apparatus is disclosed for selectively blocking signals transmitted through an HDMI cable. The apparatus comprises an input HDMI connector and an output HDMI connector with one or more signal conducting paths connecting them. One or more signal blocking elements are positioned along the conducting paths. A control unit or module communicates with the blocking elements and to activate in response to an external trigger to selectively interrupt signals between the input and output connectors. The blocking elements may be mechanical or electronic switches. An optional power source provides electrical power to the control unit and blocking elements. The blocked signals may include all signals between the connectors, only the Hot Plug Detect signal on pin 19, or only the video signals on pins 1-12.

Also disclosed is a signal blocking device for connecting between an HDMI source and display. The device comprises a housing with an input HDMI port and an output HDMI port. A signal blocking controller is positioned between the input and output ports. A user-operated switch causes the controller to interrupt signal paths between the ports, thereby blocking video signals.

Additionally disclosed is an apparatus for controlling signal transmission between an input and output. It comprises a switch with input and output connections, each having up to nineteen signal paths. The switch has two states-a closed state connecting all paths between the connections, and an open state selectively disconnecting paths. In the open state, video signal transmission is interrupted.

BRIEF DESCRIPTION OF THE DRAWINGS

The invention can be best understood by those having ordinary skill in the art by reference to the following detailed description when considered in conjunction with the accompanying drawings in which:

FIG. 4 illustrates a table correlating HDMI pins with their function.

DETAILED DESCRIPTION

Figure 1:
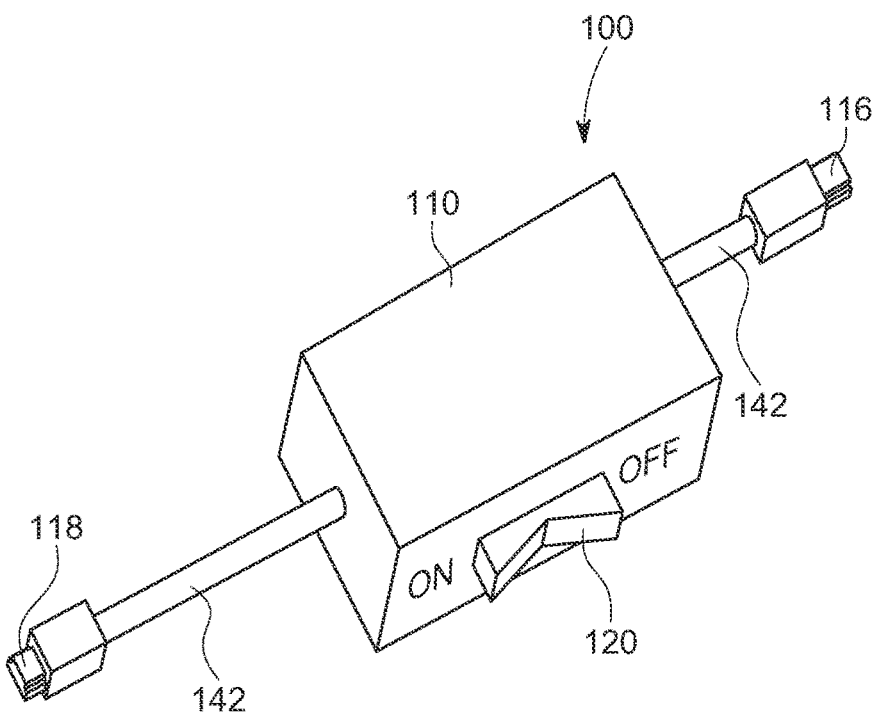
FIG. 1 illustrates a first view of a first embodiment of the HDMI display control.

Reference will now be made in detail to the presently preferred embodiments of the invention, examples of which are illustrated in the accompanying drawings. Throughout the following detailed description, the same reference numerals refer to the same elements in all figures.

Figure 2:
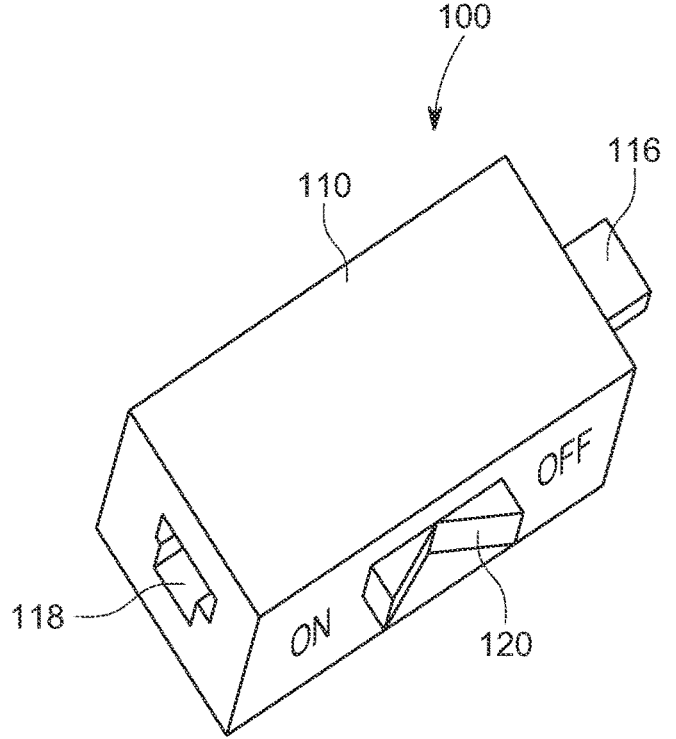
FIG. 2 illustrates a first view of a second embodiment of the HDMI display control.

Referring to FIGS. 1 and 2, a first view of a first embodiment and the second embodiment of the HDMI display control is shown.

The HDMI display control 100 includes a housing 110 with housing upper half 112 and housing lower half 114. An input 116 connects to a source, such as the computer, and the output 118 connects to a display, such as a computer monitor.

The first embodiment of the HDMI display controller 100, shown in FIG. 1, includes cable 142 between the housing 110 and the input 116 and output 118. The second embodiment, shown in FIG. 2, omits the cable 142, instead of allowing the user to plug the device directly into a source, with the cabling remaining separate.

A switch 120 controls whether the device blocks or permits the HDMI signal to pass through.

Figure 3:
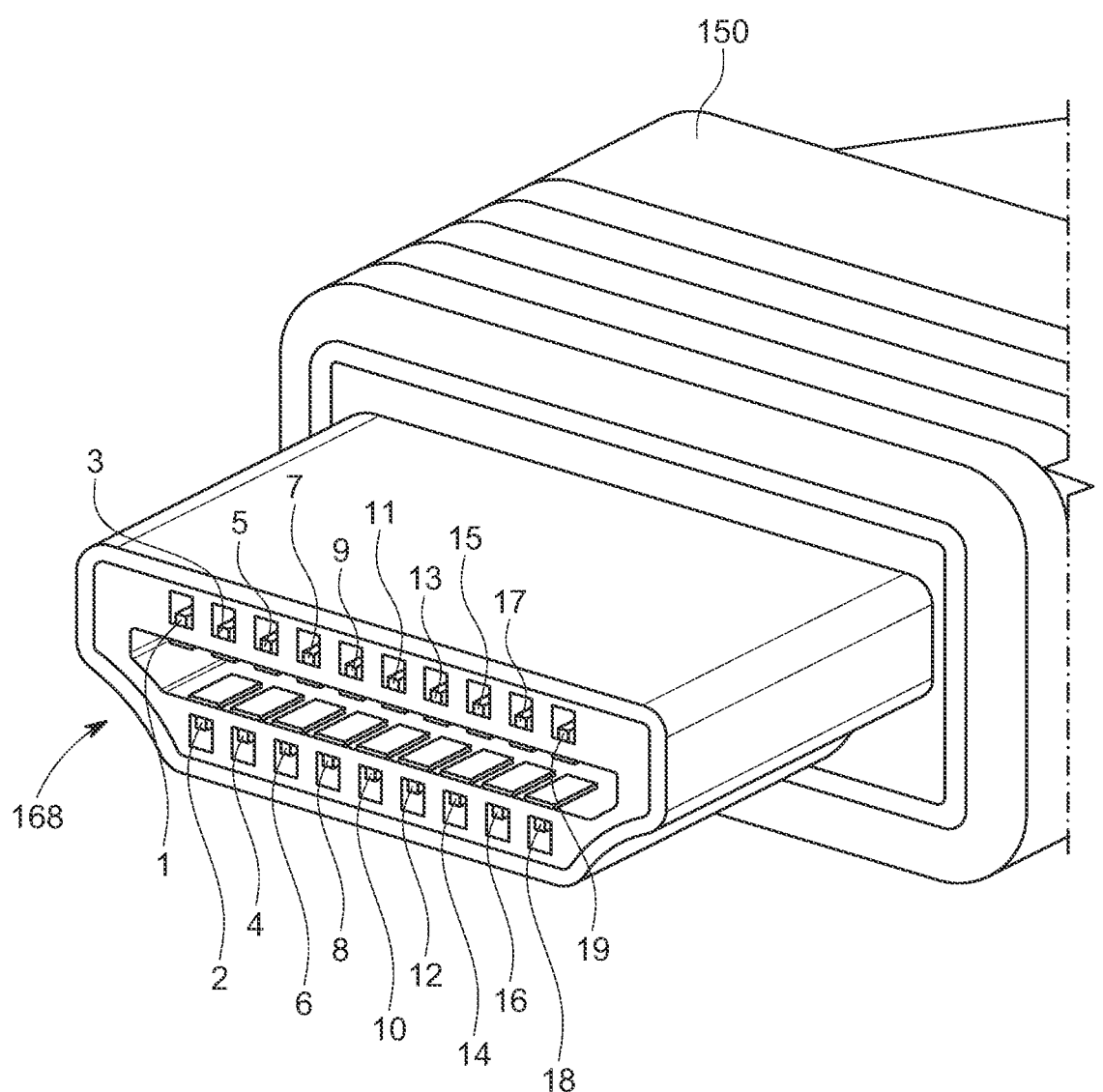
FIG. 3 illustrates a typical male HDMI connector.

Referring to FIGS. 3 and 4, a typical male HDMI connector, a table correlating HDMI pins with their function of the HDMI display control, are shown.

Figure 8:
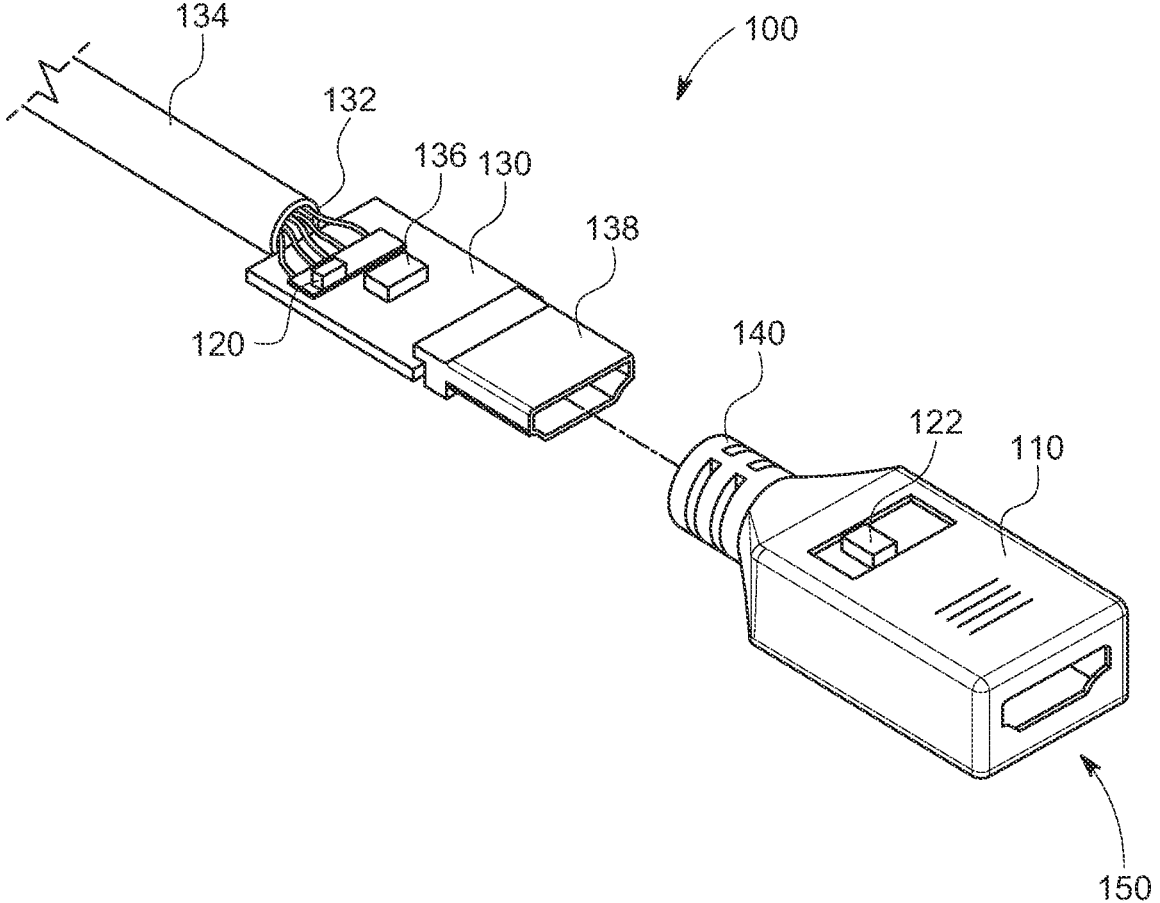
FIG. 8 illustrates an interior view of the HDMI display control.

Each HDMI pin of a connecting head 150 carries particular information between the source 160 and the display 164 (see FIG. 8).

Pins 1 through 9 carry signal data encoded using transmission minimized differential signaling, or TMDS. This formatting minimizes interference.

Pins 10 through 12 carry a clock signal to synchronize the display with the source.

Pin 13 carries remote control signals, allowing a single remote to communicate with multiple devices.

Pin 14 is not used on all devices.

Pins 15 and 16 allow the display to communicate its identification to the source.

Pin 17 is electronic ground.

Pin 18 provides 5-volt power.

Pin 19 carries a signal indicating when an HDMI cable is plugged in, signaling to the source to initiate an electronic handshake to establish communication and negotiate display capabilities. This is sometimes referred to as the Hot Plug Detect (HPD) signal.

Figure 5:
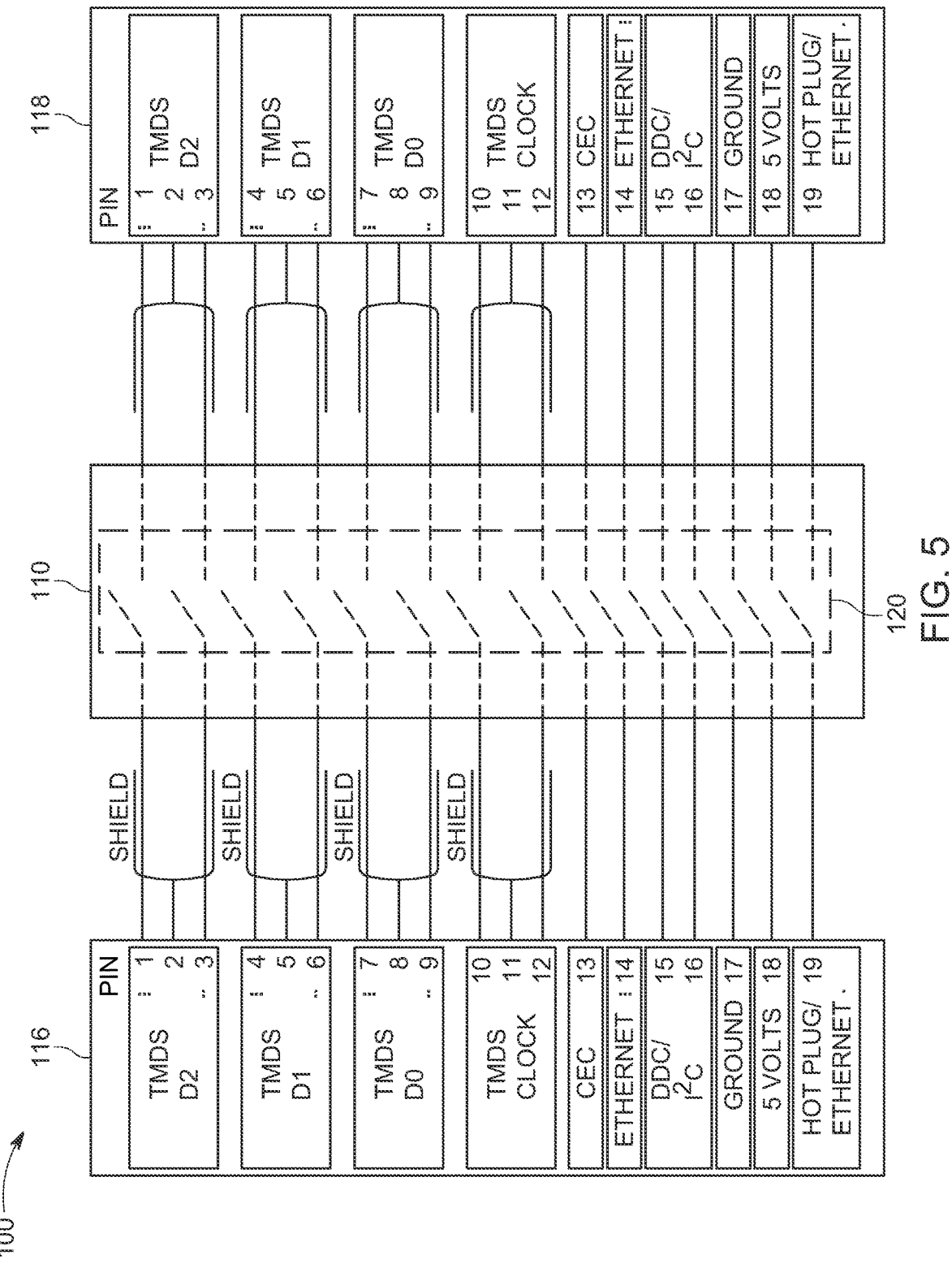
FIG. 5 illustrates a schematic view of a third embodiment of the HDMI display control.

Referring to FIG. 5, a schematic View of third embodiment of the HDMI display control is shown.

In this embodiment, the switch 120 within the housing 110 disconnects all paths between the input 116 and the output 118. This effectively disconnects the input 116 from the output 118, indicating to the source 160 the display 164 (see FIG. 8) is no longer connected.

Figure 6:
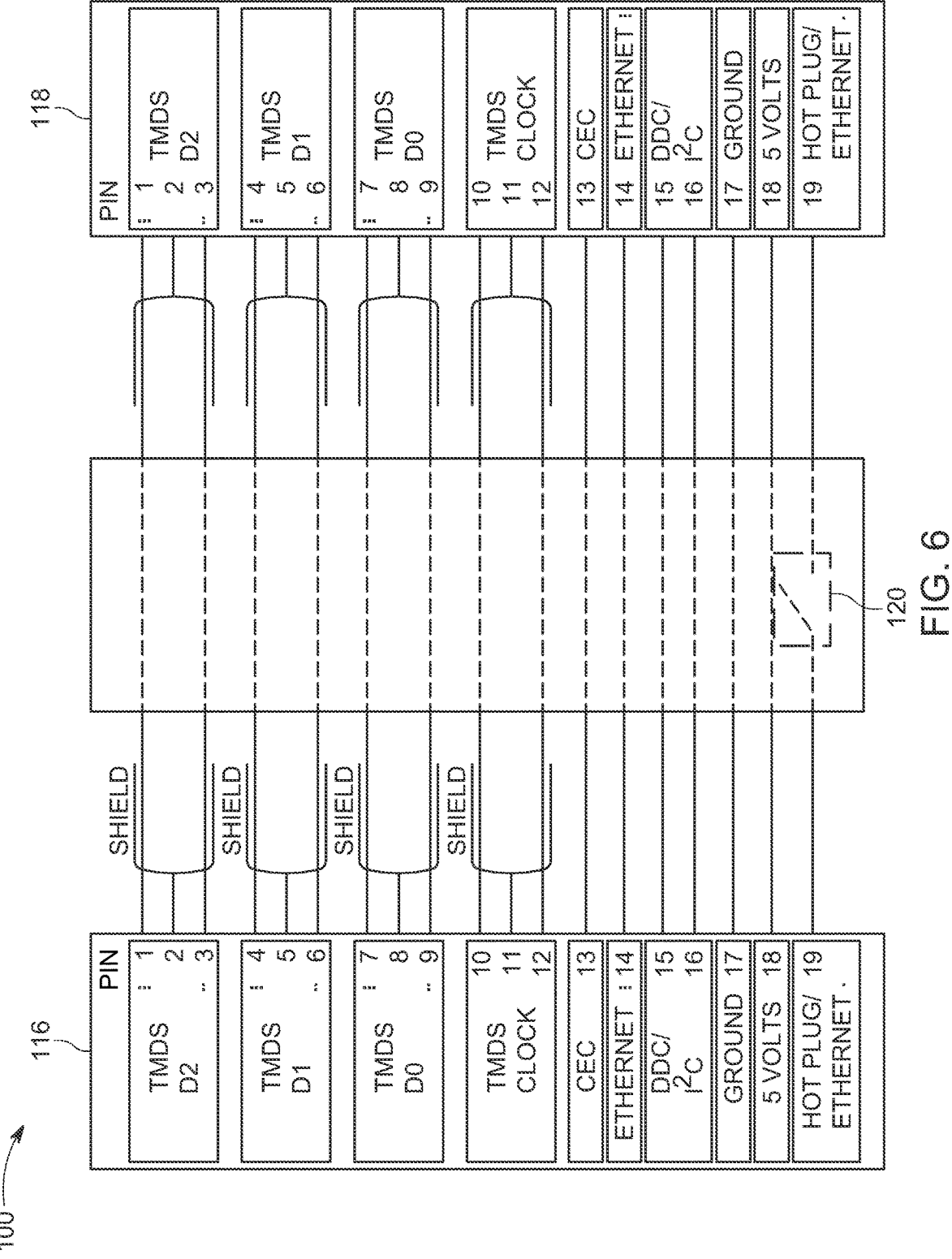
FIG. 6 illustrates schematic view of a fourth embodiment of the HDMI display control.

Referring to FIG. 6, schematic view of a fourth embodiment of the HDMI display control is shown.

In this embodiment, the switch 120 within the housing 110 disconnects only the path for pin 19 between the input 116 and the output 118. This disconnects the Hot Plug Detect path between the input 116 from the output 118, indicating to the source 160 that the display 164 (see FIG. 8) is no longer connected. This disconnect methodology may not work effectively for all sources 160 and displays 164, as compared to the alternative shown in FIG. 5, which is likely more universal.

Figure 7:
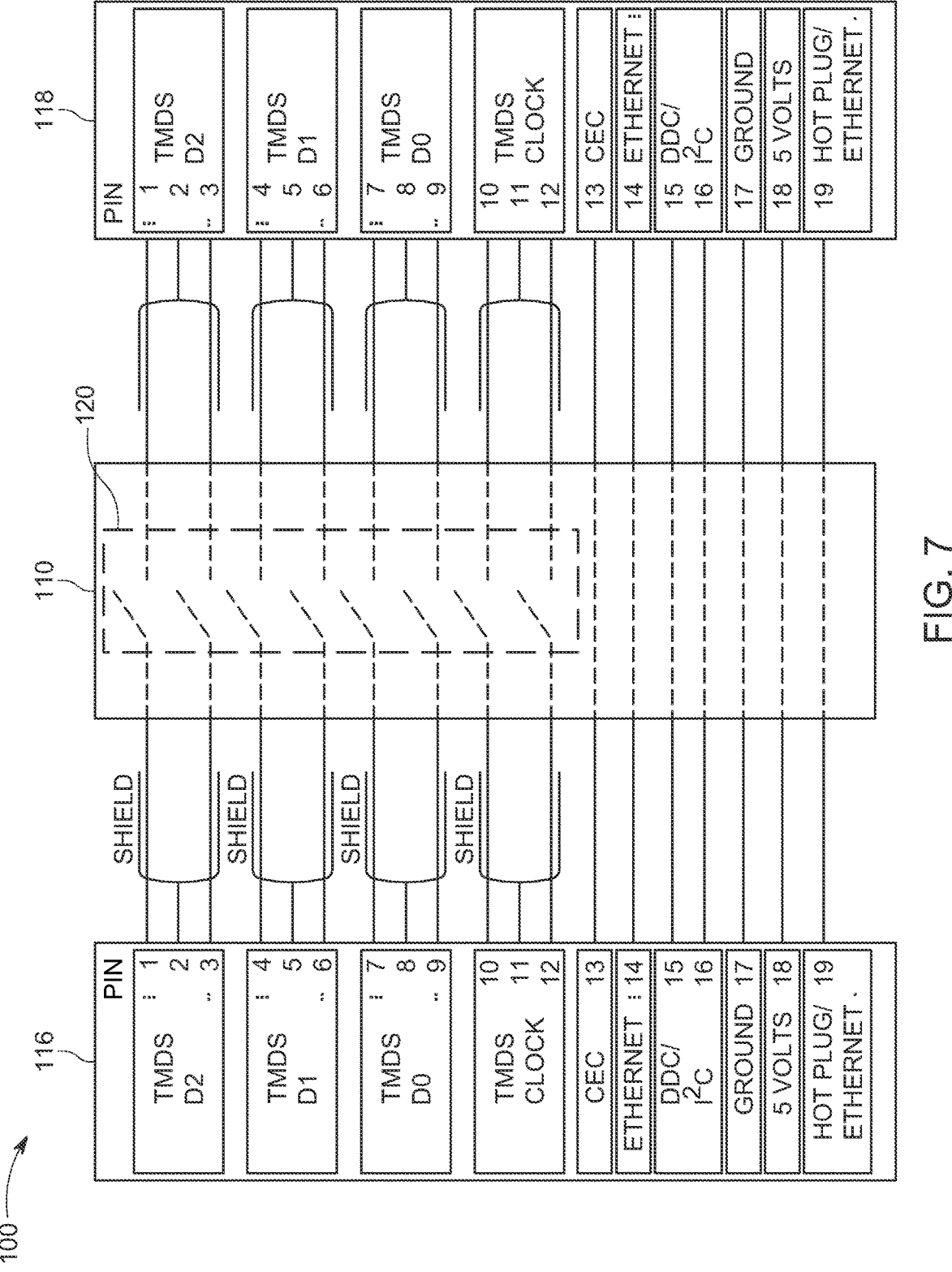
FIG. 7 illustrates schematic view of a fifth embodiment of the HDMI display control.

Referring to FIG. 7, schematic view of a fifth embodiment of the HDMI display control is shown.

In this embodiment, the switch 120 within the housing 110 disconnects only the paths for video signals—pins 1 through 12. By disconnecting these pins, the display no longer receives video from the source, but does not believe the display has been connected. This may decrease the time between actuation of the switch and reappearance of video on the display by preventing the synchronizing steps required when the source discovers a new display.

Figure 9:
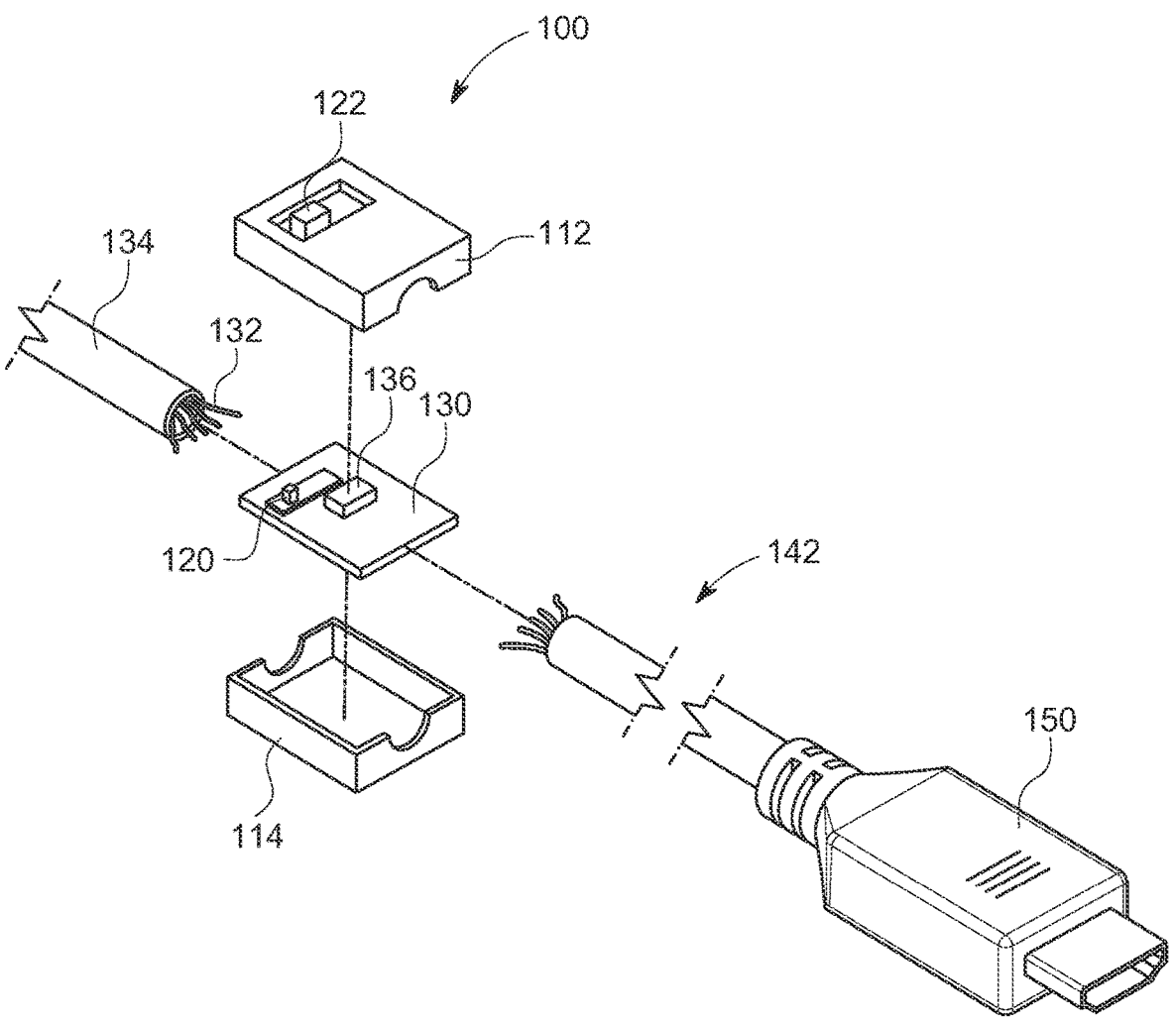
FIG. 9 illustrates a second interior view of the HDMI display control.

Referring to FIGS. 8 and 9, two interior views of the HDMI display control are shown.

The housing 110 encloses a circuit board 130 with control chip 136. Wires 132 carry signals to a switch 120 that is actuated from the outside of the housing 110 via switch cover 122. The wires 132 are enclosed in the sheath 134 to create a cable 142.

The HDMI display controller 100 can be integrated in two-way connecting head 150 as shown in FIG. 7, or in along the cable 142 between connecting heads as shown in FIG. 8. Or the HDMI display controller 100 can be manufactured without cabling, instead being a device that plugs in directly, as shown in FIG. 2.

Figure 10:
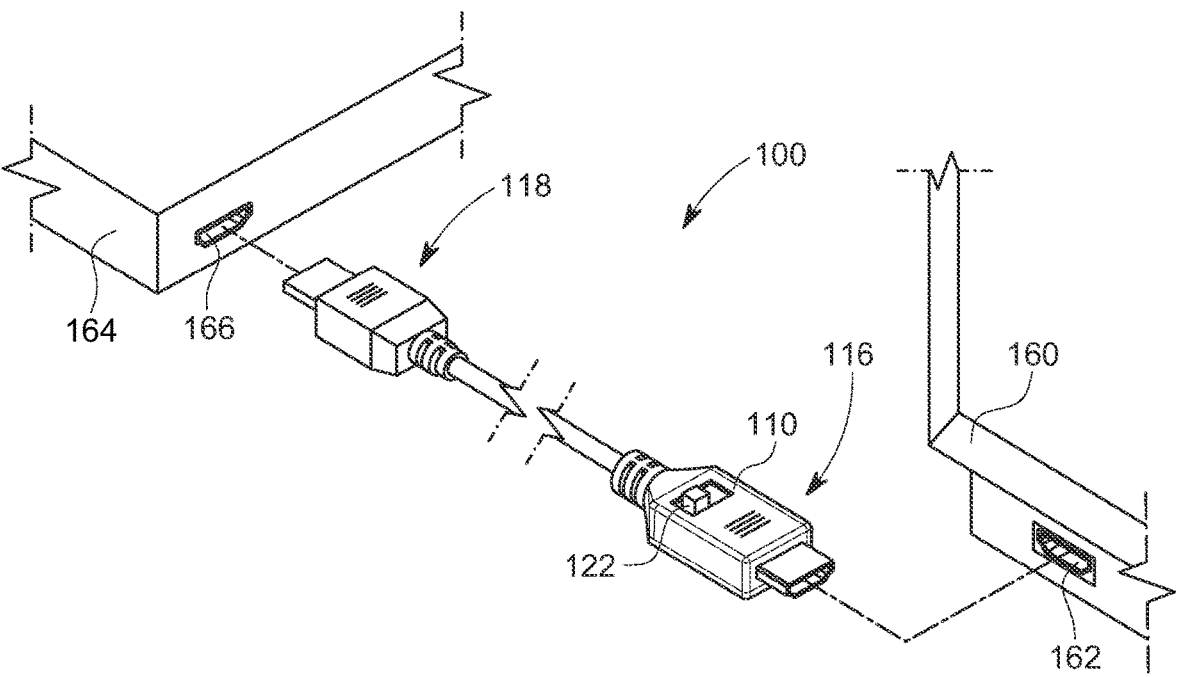
FIG. 10 illustrates a typical use of the HDMI display control.

Referring to FIG. 10, a typical use of the HDMI display control is shown. The HDMI display controller 100 is placed between source 160 with source HDMI port 162 and display 164 with display HDMI port 166. Display signals are carried from the source 160 to the input 116, where the position of the switch cover 122, and internal switch 120 (see FIG. 8) determines whether and which signals pass through to the output 118.

Equivalent elements can be substituted for the ones set forth above such that they perform in substantially the same manner in substantially the same way for achieving substantially the same result.

What is claimed is:

1. A device for selectively interrupting signal transmission through a single HDMI cable, the device comprising:
    a single HDMI input connector configured to receive HDMI signals from a single HDMI source;
    a single HDMI output connector configured to transmit HDMI signals to a single HDMI display;
        the single HDMI input connector and the single HDMI output connector each including only 19 pins;
    a plurality of signal lines passing from the single HDMI input connector to the single HDMI output connector;
        wherein the device provides a signal path between the single HDMI input connector and the single HDMI output connector;
    a mechanical switch placed along the plurality of signal lines;
        the mechanical switch configured to interrupt transmission of a particular signal or signals along the plurality of signal lines when actuated;
        the mechanical switch causing a selective interruption of one or more signals between the single HDMI input connector and the single HDMI output connector while maintaining transmission on other signal lines between the single HDMI input connector and the single HDMI output connector;
    wherein the device lacks any additional HDMI input connectors and any additional HDMI output connectors;
    wherein the device is configured to interrupt signals from only the single HDMI source to only the single HDMI display; and
    wherein the mechanical switch selectively interrupts signal lines selected from the group consisting of: all signal lines, only a Hot Plug Detect (HPD) signal line on pin 19, and only video signal lines on pins 1 through 12.

2. A signal interruption device for inline connection between a single HDMI signal source and a single HDMI display, the signal interruption device comprising:
    a housing;
    a set of HDMI connections disposed on the housing, the set of HDMI connections consisting of only:
        a single input HDMI connection;
        a single output HDMI connection;
            the single input HDMI connection and the single output HDMI connection each including only 19 pins;
    a mechanical switch for actuation by a user, the mechanical switch causing selective blocking of one or more signal paths on specific HDMI pins while maintaining transmission on other HDMI pins between the single input HDMI connection and the single output HDMI connection;

wherein signal transmission through the signal interruption device follows a single fixed path that is not selectable among multiple alternative paths; and wherein the signal interruption device lacks any multiplexer circuitry for selecting between multiple input sources;

wherein the mechanical switch selectively interrupts signal lines selected from the group consisting of: all signal lines, only a Hot Plug Detect (HPD) signal line on pin 19, and only video signal lines on pins 1 through 12.

3. A device to control transmittal of a signal between single input and single output, the device comprising:

a mechanical switch switching between only two connections, the two connections consisting of:

a first connection to act as a single input;

the first connection including nineteen signal paths and only 19 pins;

a second connection to act as a single output;

the second connection including nineteen signal paths and only 19 pins;

the mechanical switch with the two connections having a first state and a second state:

in the first state, the mechanical switch connects all nineteen signal paths between the first connection and the second connection;

in the second state, the mechanical switch selectively interrupts signal lines selected from the group consisting of: all signal lines, only a Hot Plug Detect (HPD) signal line on pin 19, and only video signal lines on pins 1 through 12, while any remaining signal paths remain connected;

wherein the mechanical switch lacks a capability to select between multiple input connections;

wherein the device is configured solely to interrupt a single signal stream and not to switch between multiple signal streams;

wherein the device is configured as an inline interruption device lacking any capability to switch between multiple inputs or multiple outputs.

\* \* \* \* \*